US006961051B2

(12) United States Patent
Weindorf et al.

(10) Patent No.: US 6,961,051 B2
(45) Date of Patent: Nov. 1, 2005

(54) CROSS-POINT MATRIX FOR INFRARED TOUCHSCREEN

(75) Inventors: Paul Fredrick Luther Weindorf, Novi, MI (US); David Ryan Anderson, West Lafayette, IN (US); Gregory J. Milne, South Lyon, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 358 days.

(21) Appl. No.: 10/353,645

(22) Filed: Jan. 29, 2003

(65) Prior Publication Data

US 2004/0145575 A1    Jul. 29, 2004

(51) Int. Cl.$^7$ .............................................. G09G 5/00
(52) U.S. Cl. ..................................... 345/175; 345/104
(58) Field of Search ............................... 345/173, 175, 345/104

(56) References Cited

U.S. PATENT DOCUMENTS

| 4,806,749 A | * | 2/1989 | Ohuchi et al. .............. 250/221 |
| 4,855,590 A | | 8/1989 | Bures et al. |
| 4,893,120 A | | 1/1990 | Doering et al. |
| 4,922,094 A | | 5/1990 | Hatanaka et al. |
| 4,928,094 A | | 5/1990 | Smith |
| 5,055,840 A | * | 10/1991 | Bartlett ........................ 341/31 |
| 5,162,783 A | | 11/1992 | Moreno |
| 5,164,714 A | * | 11/1992 | Wehrer ....................... 345/175 |
| 5,179,369 A | | 1/1993 | Person et al. |

* cited by examiner

*Primary Examiner*—Ricardo Osorio
(74) *Attorney, Agent, or Firm*—MacMillan, Sobanski & Todd, LLC (57) ABSTRACT

A circuit assembly detects a touch point within a display area. A plurality of light emitters are disposed around a periphery of the display area. A plurality of detectors are disposed around the periphery, each detector being opposed to a respective light emitter. Switching circuitry for connecting the light emitters and detectors in a switching matrix has a plurality of matrix rows and matrix columns. The switching circuitry includes a plurality of row lines, each row line corresponding to a respective matrix row and a plurality of column lines, each column line corresponding to a respective matrix column. Low-side switching transistors selectably couple the light emitters and detectors to the row and column lines, respectively. A common modulated signal is coupled to the anodes of all the light emitters. A detection signal is provided by connecting the collector terminals for the detector phototransistors in common. Consequently, high-side multiplexing circuits are avoided.

16 Claims, 10 Drawing Sheets

CROSS-POINT MATRIX FOR INFRARED TOUCHSCREEN

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to touch screen displays, and, more specifically, to touch screens employing a cross-point matrix with paired light emitters/detectors disposed around the periphery of a display area which are scanned in order to detect blockage by a finger, stylus, or other pointing device pressed against the touch screen display.

Infrared (IR) touch screens are widely used to correlate finger touches on a display screen by a user with soft buttons or soft keys displayed at various locations on the display screen. Typically, a number of IR emitters (i.e., transmitters) and detectors (i.e., receivers) are arranged around the periphery of the display screen to create a plurality of intersecting light paths. When the user touches the display, his or her finger blocks the IR transmission of certain ones of the perpendicularly arranged transmitter/receiver pairs. Based on the identity of the blocked pairs, the touch screen system can determine the location of the intercept.

IR light emitting diodes (LED's) and IR phototransistors are typically used for the emitters and detectors, respectively, and are mounted on a ring-shaped circuit board that is affixed to the front of the display screen. The circuit density of the LED/phototransistor portion of a cross-point matrix touch screen is proportional to the number of LED/phototransistor pairs deployed in the matrix (which in turn is a function of the number of touch-point locations to be sensed) and the size of the ring board. Because the light emitted from each LED cannot easily be constrained to a narrow path directed at only one phototransistor, the pairs must be activated sequentially. The multiplexing of the LED/phototransistor pairs has necessitated the use of a large number of conductor traces on the ring board to bring individual power and/or control signals to each pair and to bring out the detected output signals.

Since the ring board must be positioned outside of the display area, the overall package size of the front of a touch-screen unit has to be larger than the size of the usable display area. A large border around the display area may be undesirable in many applications, such as in automotive dashboard displays where space is limited. The border also places limits on styling of a unit and the ability to put other components (e.g., mechanical control knobs or switches) close to the display area. Furthermore, a larger size results in higher costs for the ring board and the unit as a whole.

SUMMARY OF THE INVENTION

The present invention advantageously reduces the size of a ring board by providing a locally multiplexed, low-side driven switching matrix capable of an efficient board layout with a reduced number of conductor traces. Other advantages of reduced power supply requirements, ability to operate in high ambient light conditions, fast detection time, EMI reduction, and ESD immunity are also achieved.

In one aspect of the invention, a circuit assembly is provided for detecting a touch point within a display area. A plurality of light emitters are disposed around a periphery of the display area. A plurality of detectors are disposed around the periphery, each detector being opposed to a respective light emitter. Switching circuitry for connecting the light emitters and detectors in a switching matrix has a plurality of matrix rows and matrix columns. The switching circuitry includes a plurality of row lines, each row line corresponding to a respective matrix row and a plurality of column lines, each column line corresponding to a respective matrix column. A plurality of light emitter transistors are each coupled between a respective light emitter and a respective row line. Each light emitter transistor has a control input coupled to a respective column line and responsive to a respective column select signal for connecting its respective light emitter to the respective row line. A plurality of pull-up resistances each couple a respective one of the row lines to a predetermined voltage. A plurality of row transistors are each coupled between a respective row line and ground. Each row transistor has a control input coupled to a respective row line and responsive to a row select signal for selectably connecting its respective row line to ground.

A plurality of detector transistors are each coupled between a respective detector and a respective row line. Each detector transistor has a control input coupled to a respect column line and responsive to a respective column select signal for selectably connecting its respective detector to the respective row line. Using the circuit arrangement of the present invention, a common modulated signal is used to drive all the light emitters and the detection signal is common to all of the detector transistors (e.g., applied to their collector terminals). Consequently, the high-side multiplexing circuits of the prior art are avoided.

DETAILED DESCRIPTION OF PREFERRED EMBODIMENTS

Figure 1:
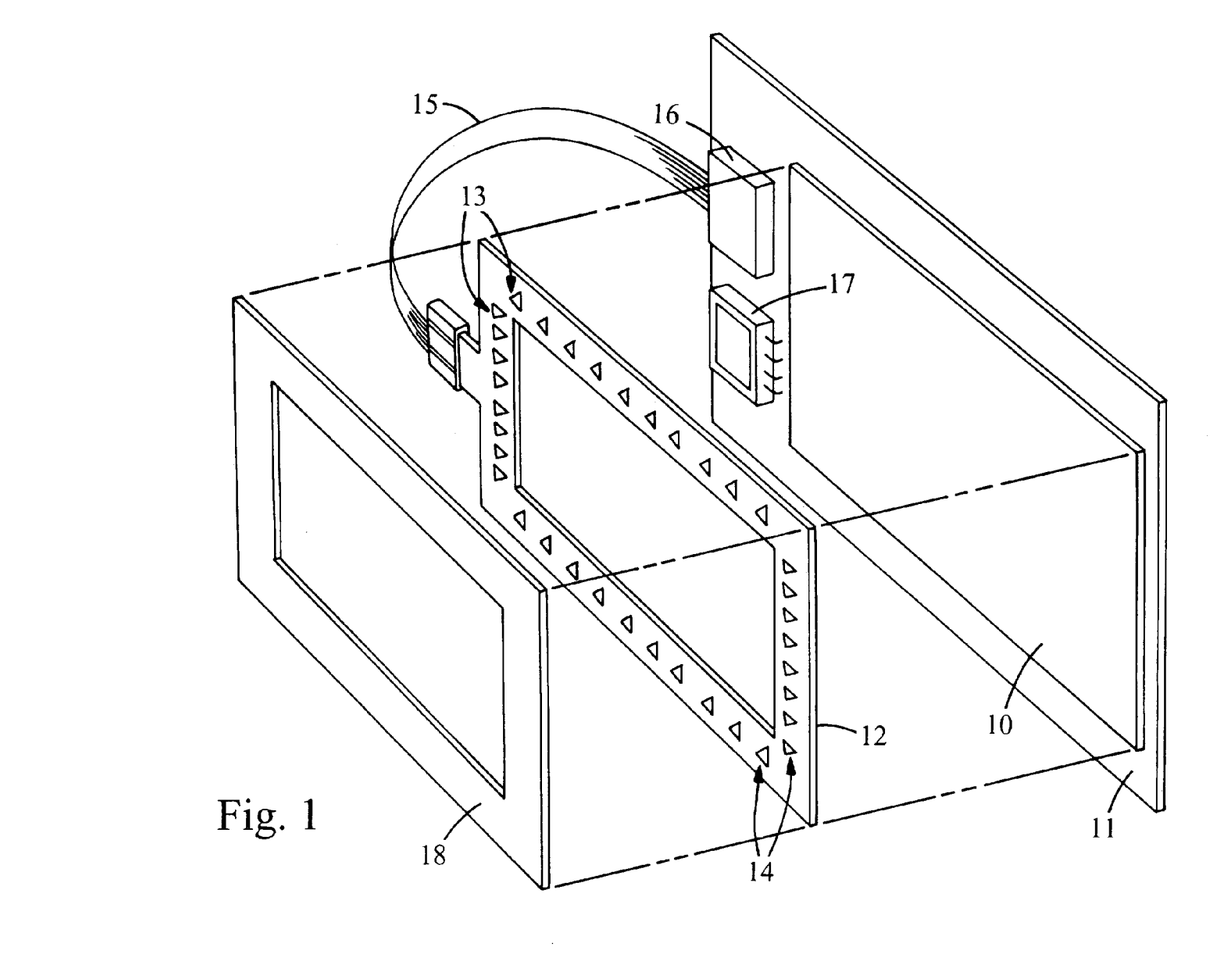
FIG. 1 is an exploded, perspective view of a touch-screen display according to the present invention.

Referring to the exploded view of FIG. 1, a display panel 10 such as an active matrix liquid crystal diode (AMLCD) display is mounted to a main circuit board 11. A ring board 12 carries emitters 13 along two adjacent sides and detectors 14 along two opposite sides so that each emitter is aligned with a detector in respective pairs. In a motor vehicle application, it is preferable that the emitters be located along the bottom and left-hand edges and the detectors be located along the top and right-hand edges to minimize interference from ambient light (less light is directed upward and the driver helps block light directed toward the right-hand edge). Emitters 13 and detectors 14 can alternatively be located on the back side of ring board 12 (i.e., on the side facing display panel 10) in order to obtain additional shading from ambient light.

A wire bundle or cable 15 connects the devices on ring board 12 to control electronics 17 on main board 11 via a connector 16. A flat flex interconnect cable with matching connectors on the ring board and the main circuit board may be used.

Control electronics 17 can be implemented in an application specific integrated circuit (ASIC) or other discrete and integrated circuits. In one preferred embodiment, a microprocessor coupled to a port expander is used to control the emitter and detector matrix as described below. A detection signal (e.g., from FIG. 6) is applied to a microprocessor input to identify a cross point being touched by the user. The microprocessor may preferably also control display functions and other functions of the display panel as known in the art.

The touch-screen display unit includes a cover or bezel 18 which overlies and conceals ring board 12 without interfering with light paths between the emitters and detectors. A protective lens may also be placed between ring board 12 and display 10 in order to protect the display from sharp objects such as fingernails. The protective lens may also include anti-fingerprint or other coatings.

Figure 2:
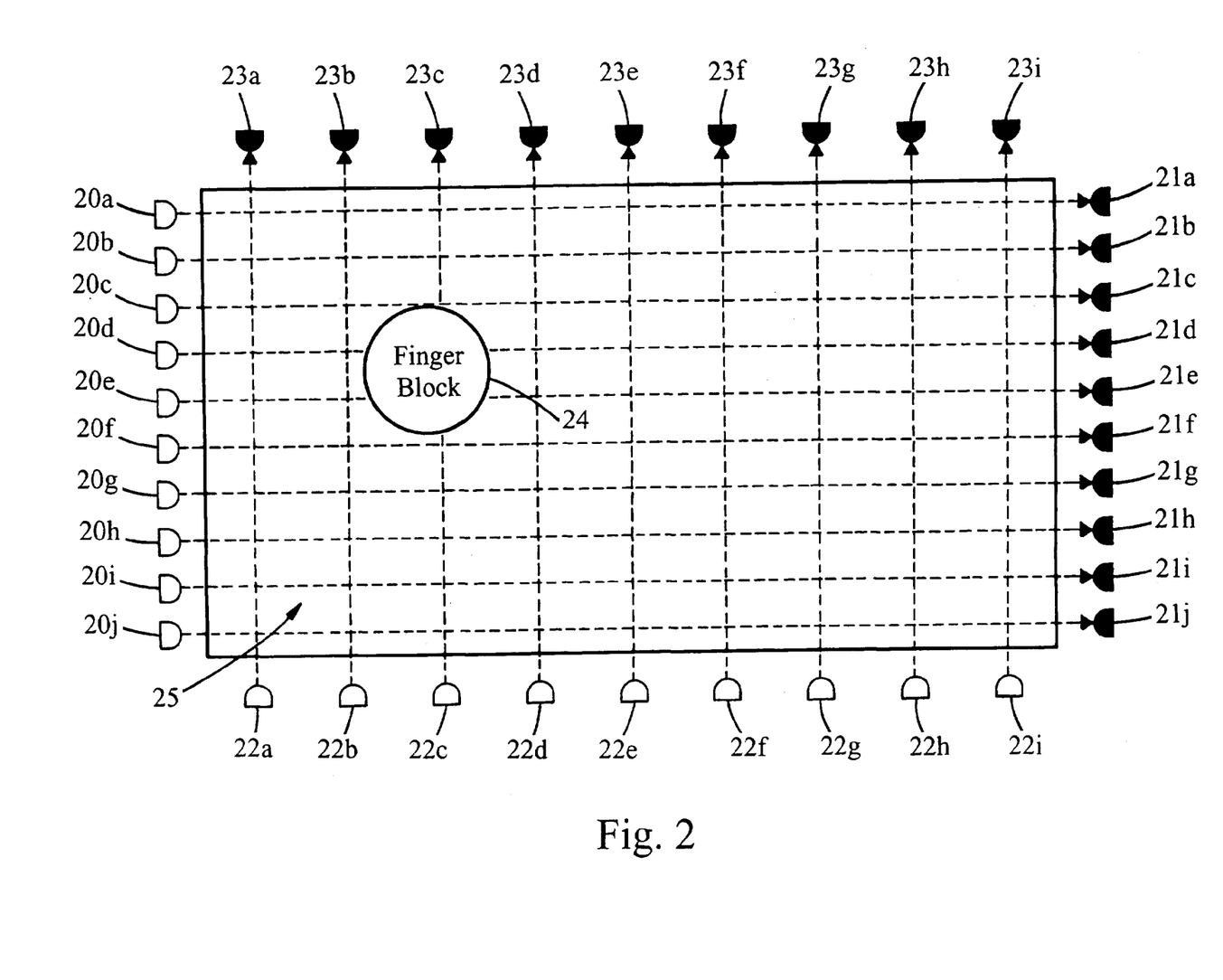
FIG. 2 is a diagrammatic view showing a cross-point matrix created by paired emitters and detectors.

A cross-point matrix is shown in greater detail in FIG. 2. LED's 20a to 20j are deployed along a left edge of a scan area 25 and are opposite phototransistors 21a to 21j, respectively, along a right edge of scan area 25. LED's 22a to 22i are deployed along a bottom edge of a scan area 25 and are opposite phototransistors 23a to 23i, respectively, along a top edge of scan area 25. To detect a finger block 24 when a user presses a finger against the underlying display screen, the LED/phototransistor pairs are activated one at a time in sequence so that each activation checks for a finger blockage along each dashed detection line between each respective LED/phototransistor pair. Since only the LED that is directly across from the phototransistor being turned on is the only LED turned on at that time, then the absence of a received signal means that there is a finger block along the corresponding light path. The horizontal rows and vertical columns are rapidly scanned (e.g. at least several times each second) and the points of intercept for any rows and columns for which the absence of a received signal are determined and then correlated with a desired user screen selection by a system controller.

The IR detectors of the present invention must typically be operable in daylight or other environments where ambient light may be greater in intensity than the light from the IR emitters. So that an unblocked signal can still be reliably detected, it is known to modulate the light output of the LED so that the modulated light is more easily distinguishable from the ambient light. A preferred embodiment of the present invention includes the improved modulation and detection circuitry shown in FIG. 3. A waveform generator 33 is connected in series with a voltage-to-current-source converter 34, an LED 20, and a low-side switching element 30. A phototransistor 21 in connected in series with a low-side switching element 31. LED 20, phototransistor 21, LED switching element 30, and phototransistor switching element 31 represent any one of a plurality of separate such groups of components that are repeated for each emitter/detector pair of the cross-point matrix.

Figure 3:
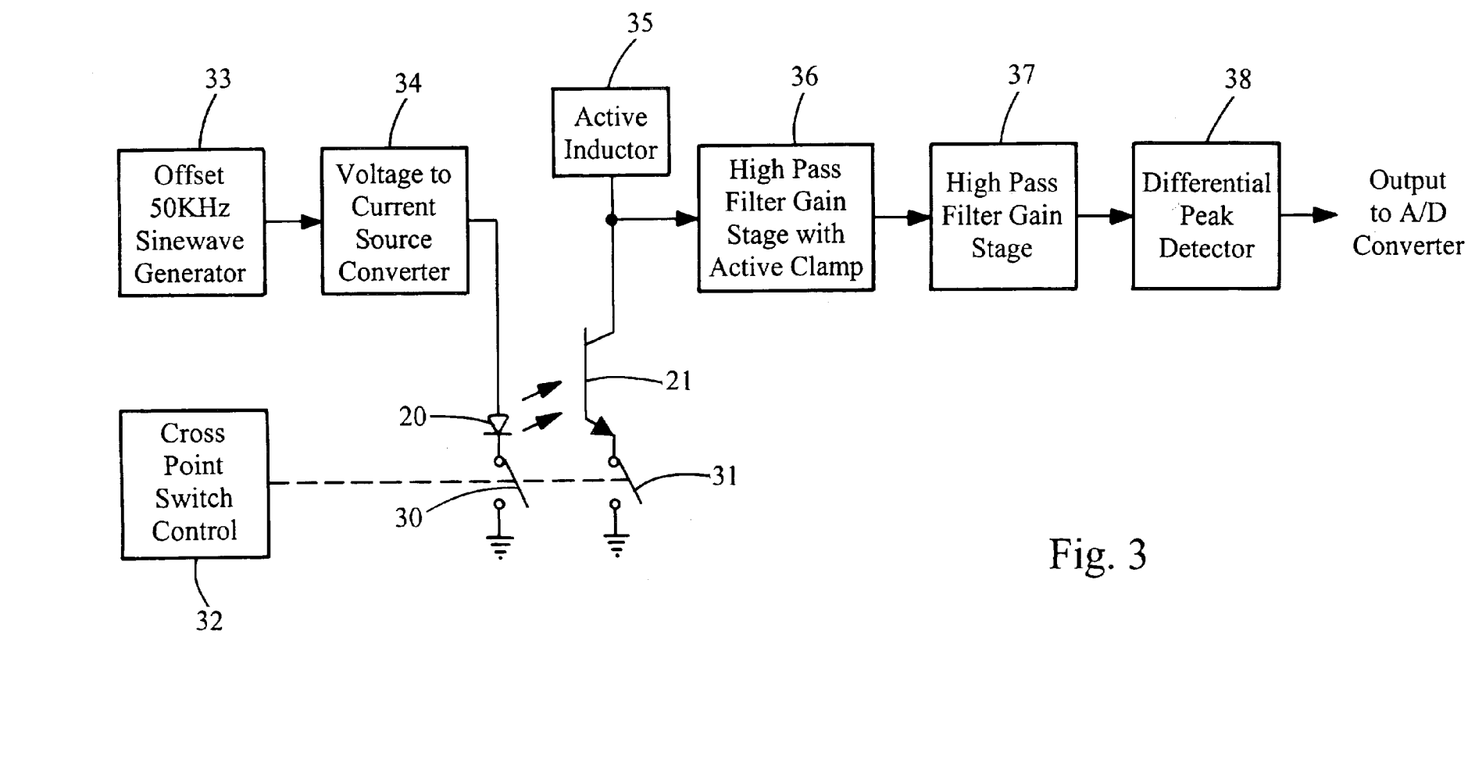
FIG. 3 is a block diagram showing a preferred embodiment of an electronic IR generation/sensing system according to the present invention.

Generator 33 preferably generates an offset (i.e., DC biased) sinewave at about 50 kHz. Instead of a sinewave generator, a square wave generated by the main microcontroller can be used (with filtering to reduce EMI). When switch 30 conducts, the 50 kHz sinewave is converted from the voltage signal into a variable current source by converter 34 and the modulated current signal is supplied to LED 20. Since the corresponding switch 31 is also conductive, any emitted light impinging on phototransistor 21 generates a corresponding current. An active inductor 35 provides a pull-up impedance for phototransistor 21. Preferably, active inductor 35 is tuned to the modulating frequency of the LED drive signal (e.g., 50 kHz) so that the desired modulated signal is enhanced and the DC component resulting from ambient light is substantially eliminated. The desired signal is further selected by a highpass gain stage 36 having an active clamp followed by a second highpass gain stage 37. The modulated signal is processed by a differential peak detector 38 and the detected signal is then output (either directly or through an A/D converter) to a controller (e.g., main microcontroller) that determines whether a light blockage has occurred.

Figure 4:
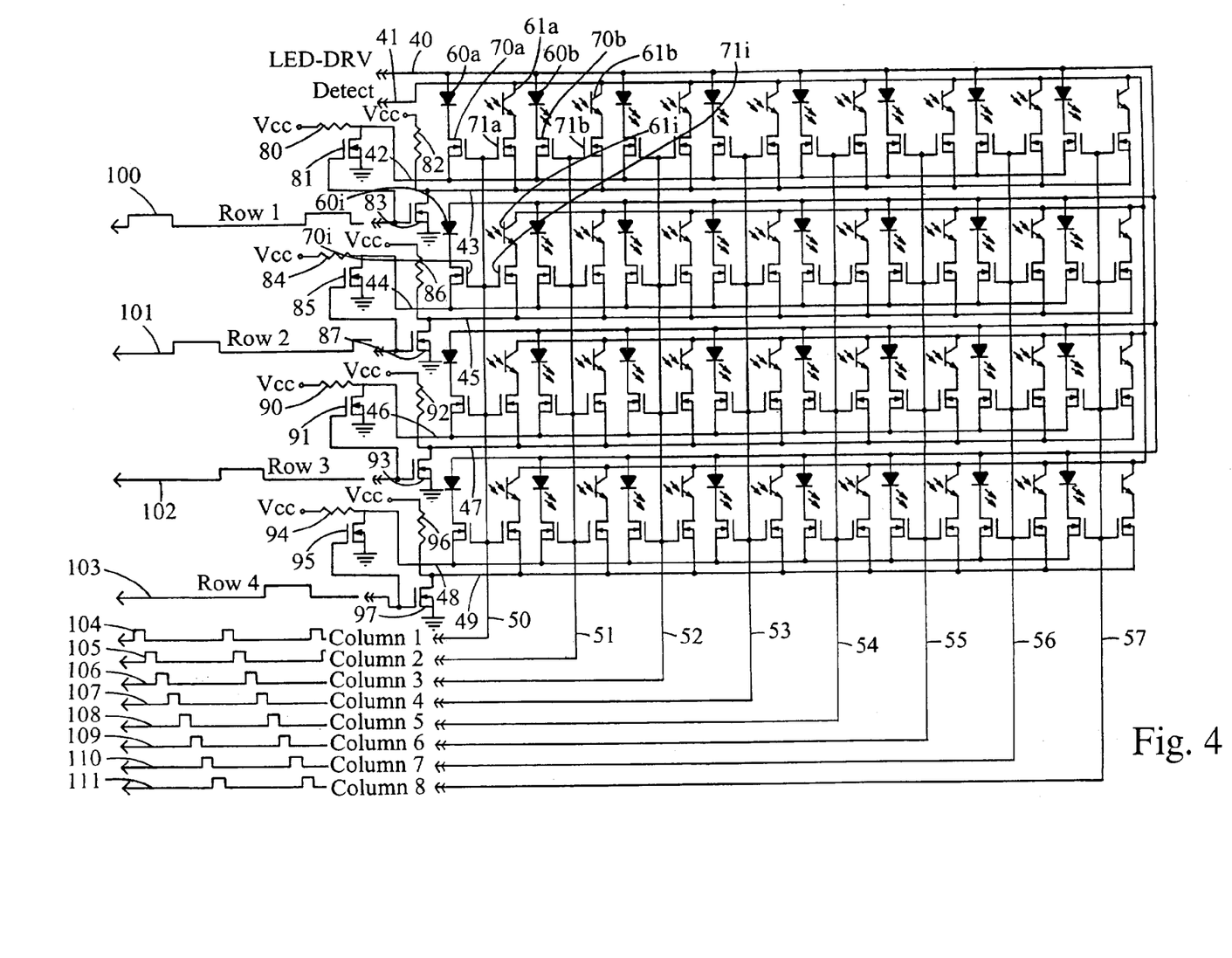
FIG. 4 is a schematic diagram showing a preferred embodiment of a locally multiplexed, low-side driven switching matrix of the present invention.
Figure 5A:
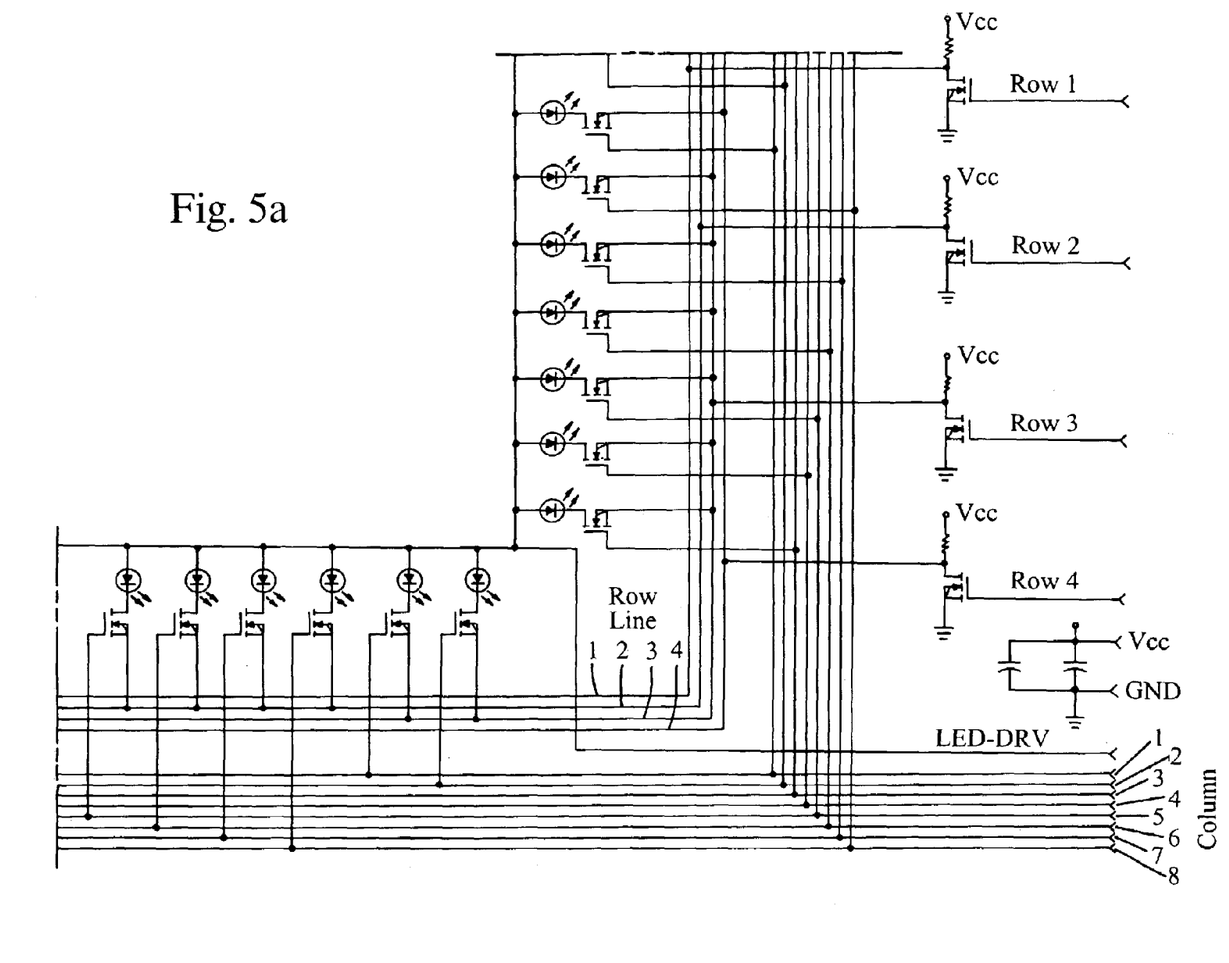
FIG. 5 shows a schematic layout for a ring board.
Figure 5B:
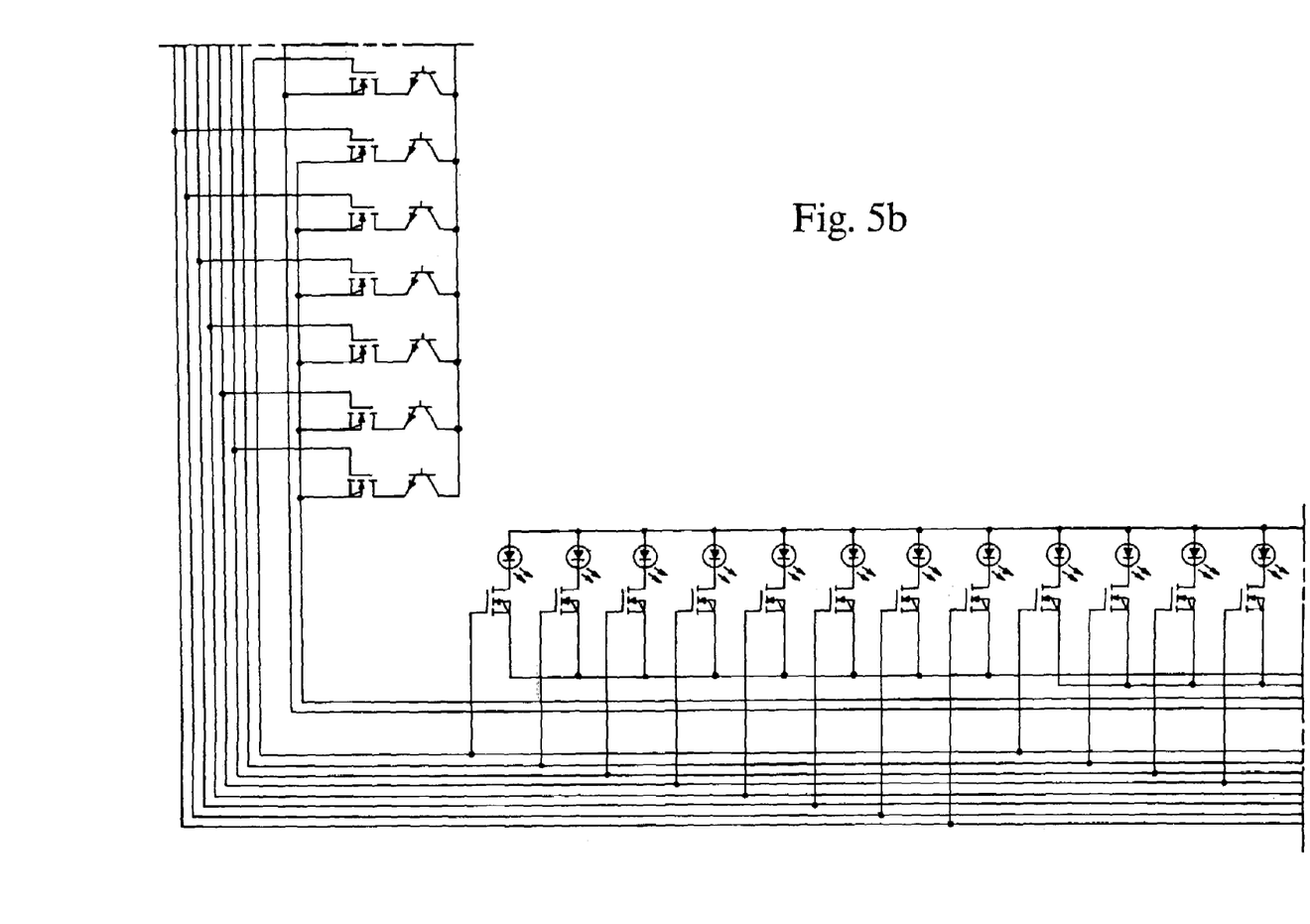
Figure 5C:
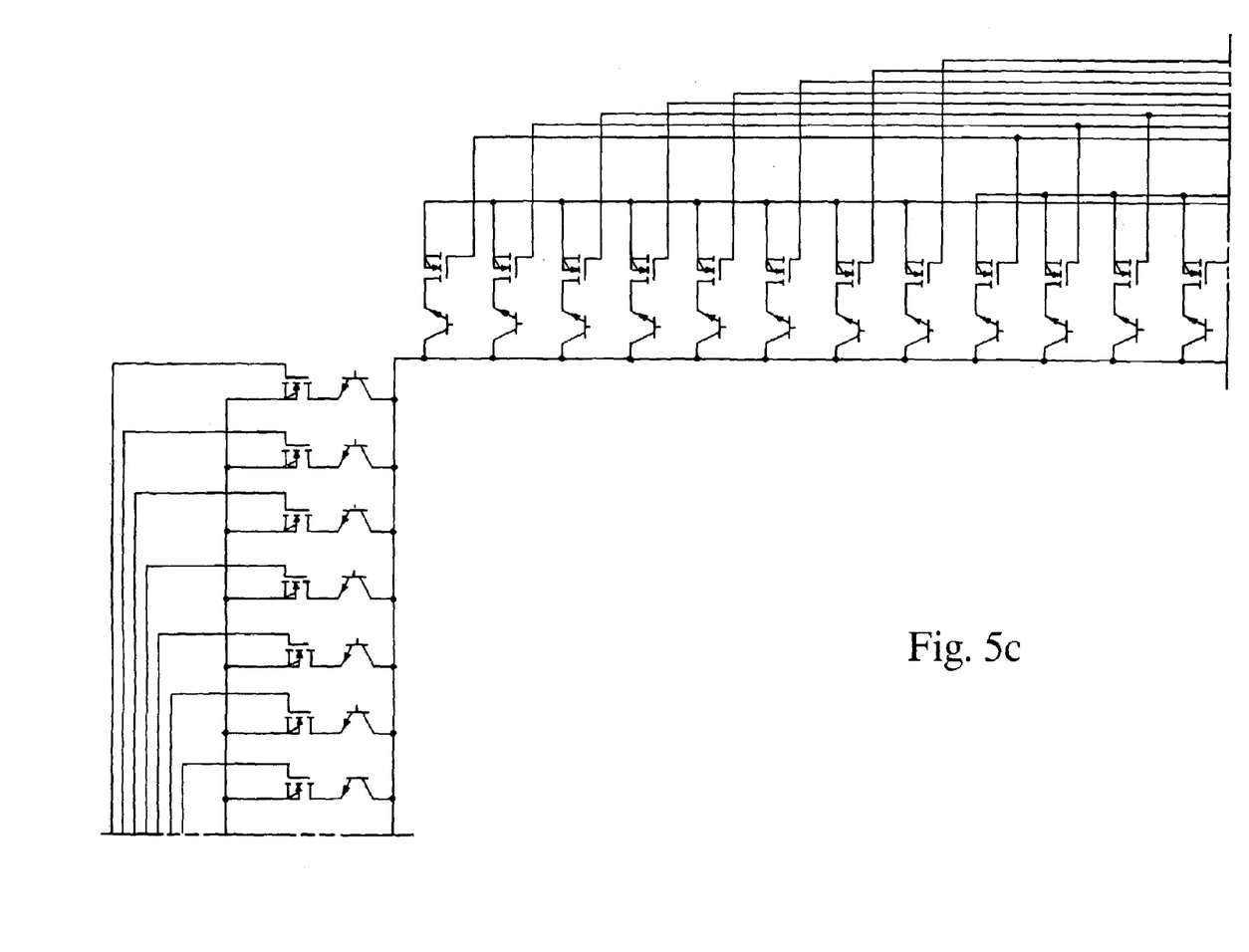
Figure 5D:
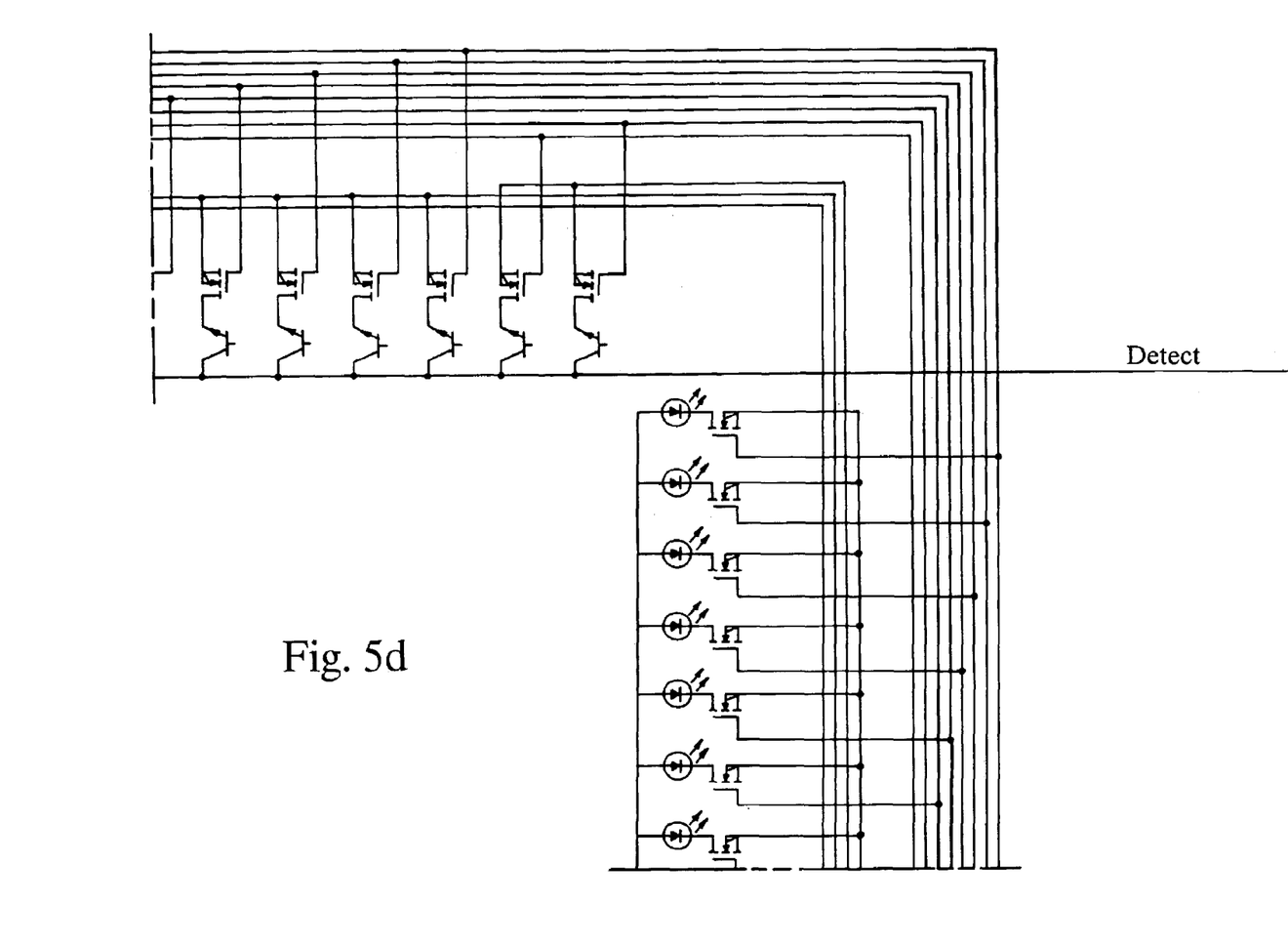

A preferred embodiment of a switching matrix is shown in FIG. 4. The electrical switching matrix should not be confused with the optical cross-point matrix. Optical cross-point matrix refers to the physical positioning of the emitter/detectors pairs to create intersecting light paths. Each horizontal row of the cross-point matrix corresponds to one emitter and one detector. Each vertical column of the cross-point matrix corresponds to one emitter and one detector.

The switching matrix of FIG. 4 is a grouping of the emitters and detectors into rows and columns with an emitter/detector pair located at each position in the matrix. Although each emitter/detector pair forming the cross-point matrix could be put in any arbitrary position of the switching matrix, the most efficient layouts of the ring board are achieved by adjacent LED's and adjacent phototransistors in the same rows of the switching matrix as much as possible.

FIG. 4 includes a total of 32 emitter/detector pairs, such as LED 60a paired with phototransistor 61a and LED 60b paired with phototransistor 61b in the first (i.e., topmost) matrix row. The second row and first column includes a pair comprising LED 60i and phototransistor 61i, which may or may not be located on the same opposing sides of the cross-point matrix as other pairs in the same or other rows or columns of the switching matrix. The switching matrix may be arranged with a number of rows R and a number of columns C that are selected to provide efficient use of signal conductor lines. The product of R and C must be equal to or greater than the total number of emitter/detector pairs and are preferably selected such that their sum is a minimum. In the present example having 32 switch matrix positions, a value of R equal to 4 and a value of C equal to 8 are shown. Six rows and six columns could also be used, but it has been found that ring board layout can be improved if the number of rows is kept as low as possible.

All 32 LED's receive the same drive signal via a current supply line 40. All 32 phototransistors have their collector outputs tied together via an detection line 41. Each LED and each phototransistor is selectably coupled to a respective row line through a respective low-side switching transistor. In the row #1, column #1 position, for example, LED 60a is coupled to a row line 42 by a field-effect transistor (FET) 70a and phototransistor 61a is coupled to a row line 43 by a FET 71a. Separate row lines for the LED's and the phototransistors as shown in FIG. 4 reduces any cross coupling of signals. Depending upon a particular circuit design (e.g., the type of FET's that are used), cross coupling may not be a problem and a single row line connected to both the low-side switches for the LED's and the low-side switches for the phototransistors could be used. Row lines 44–49 are provided for the second through fourth rows as shown.

Row line 42 is coupled to a predetermined supply voltage $V_{cc}$ by a pull-up resistor 80 and is selectably coupled to ground by a row transistor 81. Row line 43 for the first row of phototransistors is coupled to predetermined supply voltage $V_{cc}$ by a pull-up resistor 82 and is selectably coupled to ground by a row transistor 83. In the second row, row lines 44 and 45 are connected to pull-up resistors 84 and 86, respectively, and to row transistors 85 and 87, respectively. In the third row, row lines 46 and 47 are connected to pull-up resistors 90 and 92, respectively, and to row transistors 91 and 93, respectively. In the fourth row, row lines 48 and 49 are connected to pull-up resistors 94 and 96, respectively, and to row transistors 95 and 97, respectively.

A column line 50 is connected to the gate terminals of all the LED FET's and all the phototransistor FET's in the first column, including the gates of FET's 70a and 71a in the first row and FET's 70i and 71i in the second row. Column lines 51–57 are similarly connected to the FET's in the corresponding columns.

In order to turn on the FET's of any LED/phototransistor pair, the corresponding row line(s) must be tied to a low voltage level and the corresponding column line must be driven to a high voltage level. For any matrix element (i.e., emitter/detector pair) with a low voltage level on its column line, the corresponding FET's will be off such that the LED does not emit light and the phototransistor does not generate a detection signal. For any matrix element with a high voltage level on its column line but a low voltage level at the input(s) of its row transistor(s), the row line(s) are pulled to a high voltage level by the corresponding pull-up resistor(s) and the LED and phototransistor of the matrix element remain off. When the row signal at the input(s) of the row transistor(s) are high, the row transistor(s) turn on and the corresponding row line(s) are pulled low, thereby allowing the corresponding LED and phototransistor to conduct.

Scanning of the switching matrix may preferably be performed across a complete row before progressing to the next row as shown by the signal waveforms applied to the column lines and to the row transistors as shown in FIG. 4. Thus, a first row signal 100 goes high during a first time window for scanning the first row. Within the first time window, column signals 104 through 111 briefly go high one at a time to check each corresponding light path for a blockage. Then in succeeding time windows, row signals 101, 102, and 103 go high while the column signals cycle within each time window. When an emitted signal is detected, then no blockage is present for the matrix element being activated, otherwise a blockage is detected and memorized for correlation with other matrix elements detecting a blockage so that the intersection within the cross-point matrix is determined.

Alternatively, scanning of the switching matrix can be performed by scanning each column in succession instead of scanning by rows. This may achieve a faster response time for the active inductor.

The switching matrix of FIG. 4 can be organized for a layout on a ring board as shown in FIGS. 5A–5D. In this embodiment, each row includes only one row line and only one row transistor driven by respective row signals. The number of signal lines required on the ring board equals the number of rows plus the number of columns plus four (the LED current supply, the phototransistor detection signal, $V_{cc}$ power input, and ground). Since the LED's and phototransistors are locally multiplexed at the ring board, the conductor traces for signal lines around the ring board are greatly reduced. In this example with a 4×8 switching matrix, the number of conductive traces circling the ring board to access the LED's and phototransistors is less than or equal to 13 (4 row lines plus 8 column lines plus either the LED drive signal line or the phototransistor detection line). If desired, a ground line may be added around the inner and/or outer periphery to reduce electromagnetic interference (EMI) emissions and to provide immunity to electrostatic discharge (ESD).

Figure 6:
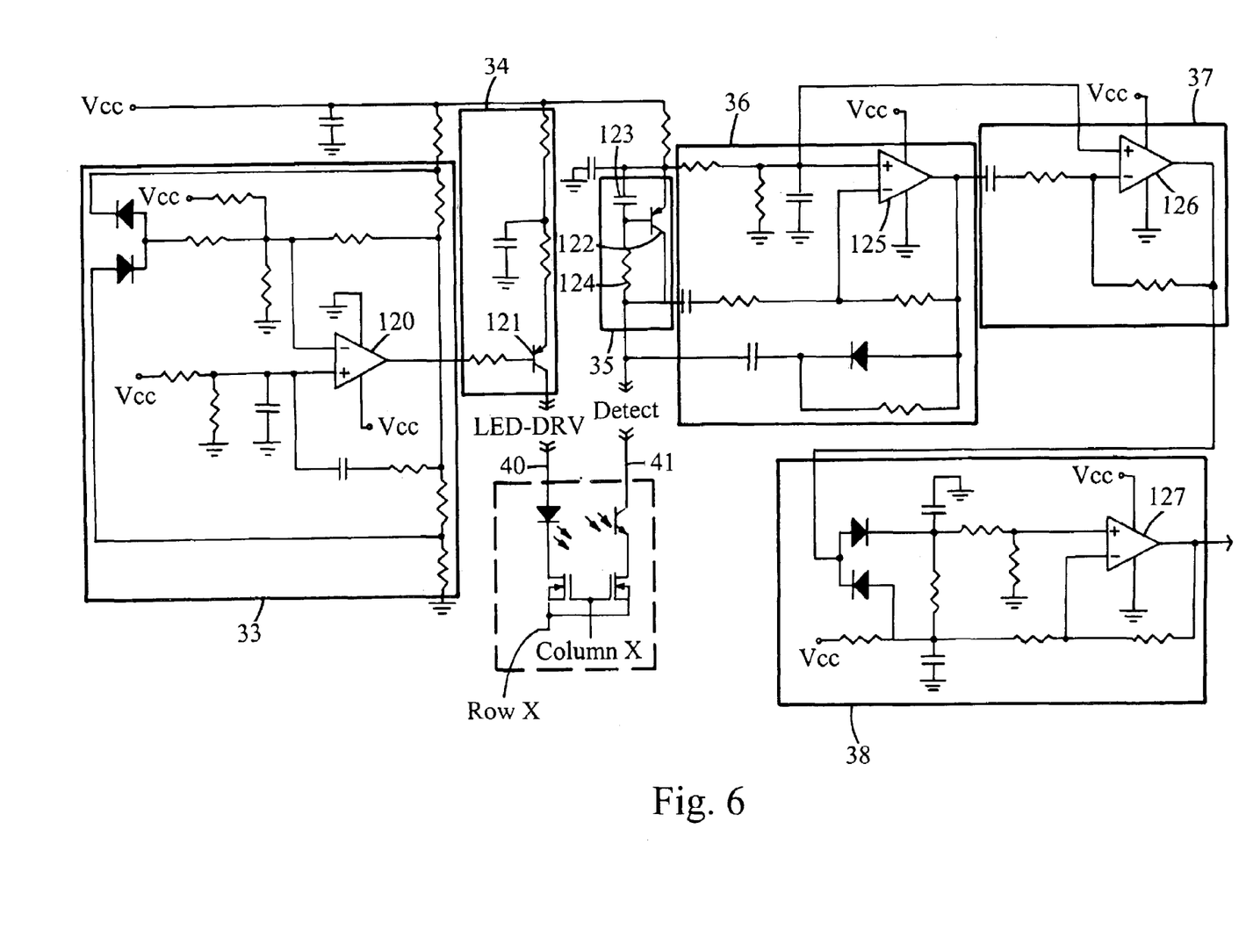
FIG. 6 is a schematic diagram showing portions of FIG. 3 in greater detail.

FIG. 6 shows the circuit elements of FIG. 3 in greater detail. Sinewave generator 33 generates an offset sinewave with an average current of about 10 mA using a rail-to-rail operational amplifier 120 (e.g., one of four op amps in a TLC2274 integrated circuit manufactured by Texas Instruments). Use of rail-to-rail amplifiers and the lower drive voltage requirements for having low-side FET switches allow a 5-volt system to be realized.

A converter 34 for changing the offset sinewave voltage into an offset current source includes a transistor 121 supplying an LED_DRV current signal to line 40. Active inductor 35 is formed by a transistor 122, a capacitor 123, and a resistor 124. Active inductor 35 acts as a highpass filter to block DC and low frequency signals that correspond to ambient light.

Gain stages 36 and 37 are based on op amps 125 and 126. The active clamp of gain stage 36 reduces system saturation at the switch engage time. Differential peak detector 38 rectifies the amplified and filtered signal from gain stage 37 and then performs peak detection using op amp 127. The output signal $V_{out}$ from peak detector 38 has a high logic level when a detected signal was present and a low logic level when the IR light path was blocked.

Figure 7:
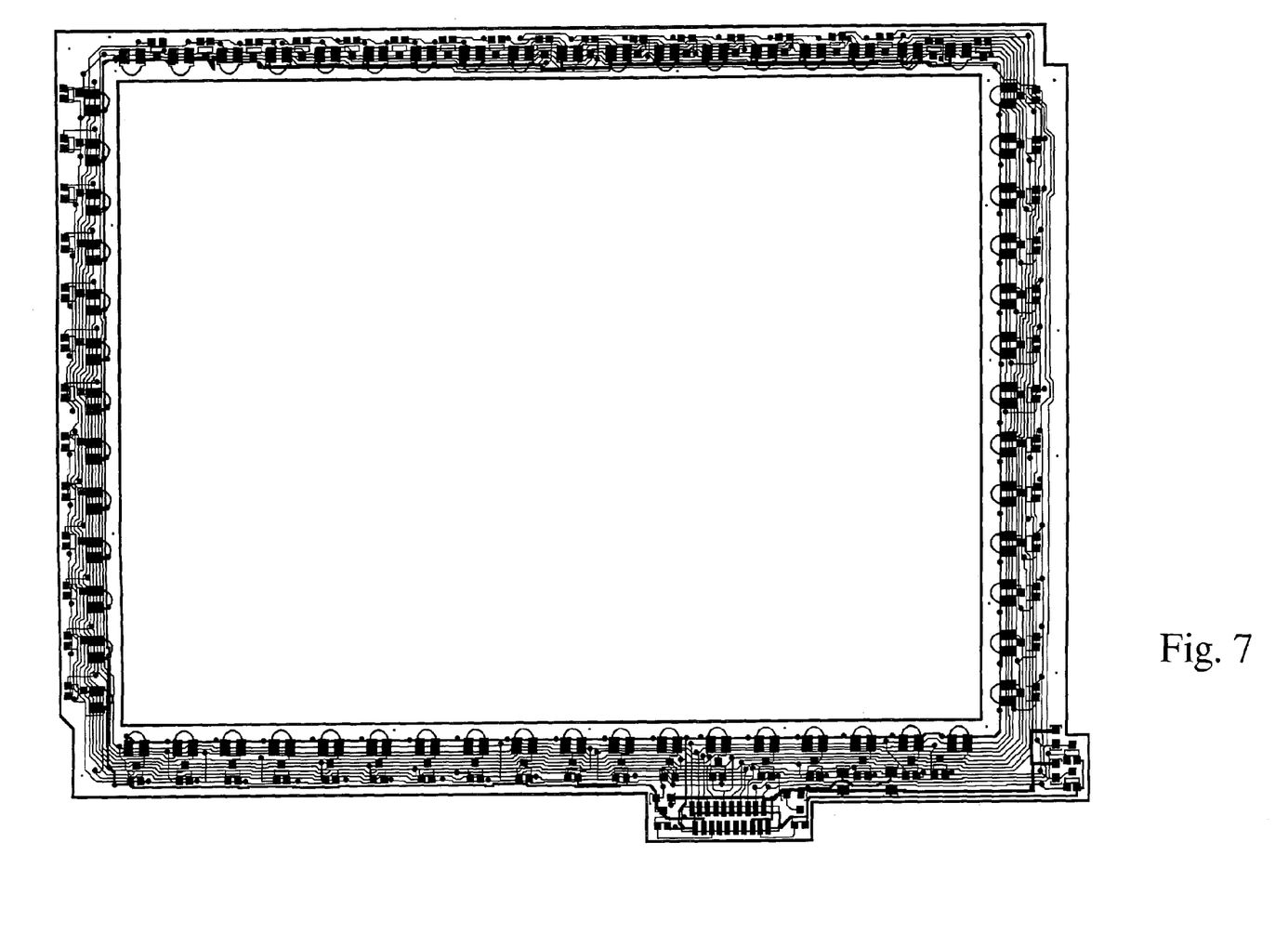
FIG. 7 is a top view of a ring board having one embodiment of a conductor trace pattern according to the present invention.

FIG. 7 shows a conductor pattern for a ring board employing the local multiplexing and low-side switching of the present invention. The ring board occupies only a very thin border around the detection area, thereby reducing costs and achieving the styling and size objectives for automotive and other applications.

What is claimed is:
1. A circuit assembly for detecting a touch point within a display area, comprising:
    a plurality of light emitters disposed around a periphery of said display area;
    a plurality of detectors disposed around said periphery, each detector being opposed to a respective light emitter; and
    switching circuitry for connecting said light emitters and detectors in a switching matrix having a plurality of matrix rows and matrix columns, wherein said switching circuitry includes:
        a plurality of row lines, each row line corresponding to a respective matrix row;
        a plurality of column lines, each column line corresponding to a respective matrix column;
        a plurality of light emitter transistors each coupled between a respective light emitter and a respective row line, each light emitter transistor having a control input coupled to a respective column line and responsive to a respective column select signal for connecting its respective light emitter to said respective row line;

a plurality of pull-up resistances each coupling a respective one of said row lines to a predetermined voltage; and a plurality of row transistors each coupled between a respective row line and ground, each row transistor having a control input coupled to a respective row line and responsive to a row select signal for selectably connecting its respective row line to ground.

2. A touch screen display comprising:

an electronically-controlled visual display panel for presenting visual information within a display area;

a touch-point circuit assembly including:

a plurality of light emitters disposed around a periphery of said display area;

a plurality of detectors disposed around said periphery, each detector being opposed to a respective light emitter, said detectors having respective output terminals connected in common to provide a detection signal; and switching circuitry for connecting said light emitters and detectors in a switching matrix having a plurality of matrix rows and matrix columns, wherein said switching circuitry includes:

a plurality of row lines, each row line corresponding to a respective matrix row;

a plurality of column lines, each column line corresponding to a respective matrix column;

a plurality of light emitter transistors each coupled between a respective light emitter and a respective row line, each light emitter transistor having a control input coupled to a respective column line and responsive to a respective column select signal for connecting its respective light emitter to said respective row line;

a plurality of pull-up resistances each coupling a respective one of said row lines to a predetermined voltage; and a plurality of row transistors each coupled between a respective row line and ground, each row transistor having a control input coupled to a respective row line and responsive to a row select signal for selectably connecting its respective row line to ground; and a controller for selectably activating pairs of said light emitters and detectors in a sequence to detect said touch point.

3. The touch screen display of claim 2 wherein said light emitters are comprised of light emitting diodes having their anodes connected in common.

4. The touch screen display of claim 3 further comprising a power modulator for supplying modulated power having a predetermined modulation frequency to said commonly connected anodes of said light emitting diodes.

5. The touch screen display of claim 2 wherein said switching circuitry further includes:

a plurality of detector transistors each coupled between a respective detector and a respective row line, each detector transistor having a control input coupled to a respective column line and responsive to a respective column select signal for selectably connecting its respective detector to said respective row line.

6. The touch screen display of claim 5 wherein said touch-point circuit assembly further comprises:

a ring-shaped printed wiring board (PWB) having a central aperture coinciding with said display area, said PWB having said light emitters and said detectors mounted around a periphery thereof, wherein each of said respective light emitter transistors is mounted on said PWB proximate to its respective light emitter, and wherein each of said respective detector transistors is mounted on said PWB proximate to its respective detector.

7. The touch screen display of claim 6 wherein said PWB includes conductor traces routed around said periphery to provide said row lines and said column lines.

8. The touch screen display of claim 2 wherein said detectors are comprised of phototransistors having their collector terminals connected in common for providing a detection signal.

9. The touch screen display of claim 8 further comprising an active clamp coupled to said detectors to receive said detection signal, said active clamp eliminating residual charge between activation of said selectably activated pairs.

10. The touch screen display of claim 2 further comprising an active inductor coupled to each of said detectors, said active inductor providing a highpass filter.

11. The touch screen display of claim 10 further comprising a differential peak detector coupled to said active inductor and responsive to said reception signal for detecting when a touch point between a selected light emitter and a selected detector is obstructed.

12. A circuit assembly for detecting a touch point within a display area, comprising:

a plurality of light emitters disposed around a periphery of said display area;

a plurality of detectors disposed around said periphery, each detector being opposed to a respective light emitter; and switching circuitry for connecting said light emitters and detectors in a switching matrix having a plurality of matrix rows and matrix columns, wherein said switching circuitry includes:

a plurality of row lines, each row line corresponding to a respective matrix row;

a plurality of column lines, each column line corresponding to a respective matrix column;

a plurality of light emitter transistors each coupled between a respective light emitter and a respective row line, each light emitter transistor having a control input coupled to a respect column line and responsive to a respective column select signal for connecting its respective light emitter to said respective row line;

a plurality of pull-up resistances each coupling a respective one of said row lines to a predetermined voltage;

a plurality of row transistors each coupled between a respective row line and ground, each row transistor having a control input coupled to a respective row line and responsive to a row select signal for selectably connecting its respective row line to ground; and a plurality of detector transistors each coupled between a respective detector and a respective row line, each detector transistor having a control input coupled to a respective column line and responsive to a respective column select signal for selectably connecting its respective detector to said respective row line.

13. The circuit assembly of claim 12 further comprising a ring-shaped printed wiring board (PWB) having a central aperture coinciding with said display area, said PWB having said light emitters and said detectors mounted around a periphery thereof, wherein each of said respective light emitter transistors is mounted on said PWB proximate to its respective light emitter, and wherein each of said respective detector transistors is mounted on said PWB proximate to its respective detector.

14. The circuit assembly of claim 13 wherein said PWB includes conductor traces routed around said periphery to provide said row lines and said column lines.

15. The circuit assembly of claim 12 wherein said light emitters are comprised of light emitting diodes having their anodes connected in common for connecting to a current source.

16. The circuit assembly of claim 12 wherein said detectors are comprised of phototransistors having their collector terminals connected in common for providing a detection signal.

* * * * *